US008231379B2

(12) United States Patent
Schmid et al.

(10) Patent No.: US 8,231,379 B2
(45) Date of Patent: Jul. 31, 2012

(54) APPARATUS FOR PRODUCING PLASTIC CONTAINERS

(75) Inventors: Florian Schmid, Ihrlerstein (DE); Frank Winzinger, Regensburg (DE); Christian Wittmann, Hemau (DE)

(73) Assignee: Krones AG, Neutraubling (DE)

( * ) Notice: Subject to any disclaimer, the term of this patent is extended or adjusted under 35 U.S.C. 154(b) by 125 days.

(21) Appl. No.: 12/703,449

(22) Filed: Feb. 10, 2010

(65) Prior Publication Data

US 2010/0203187 A1      Aug. 12, 2010

(30) Foreign Application Priority Data

Feb. 12, 2009   (DE) .......................... 10 2009 008 632

(51) Int. Cl.
*B29C 49/56*     (2006.01)
*B29C 49/58*     (2006.01)

(52) U.S. Cl. ........................................ 425/535; 425/541
(58) Field of Classification Search .................. 425/535, 425/541

See application file for complete search history.

(56) References Cited

U.S. PATENT DOCUMENTS

| 1,529,622 A | * | 3/1925 | Haley ................................ 65/357 |
| 2,269,553 A | * | 1/1942 | Roessler ............................ 65/75 |
| 2,361,553 A | * | 10/1944 | Luertzing ........................ 65/302 |
| 2,974,362 A | * | 3/1961 | Knowles ........................ 425/533 |
| 3,050,773 A | * | 8/1962 | Hagen ............................. 264/534 |
| 3,195,186 A | * | 7/1965 | Gauban et al. ................. 425/590 |
| 3,470,284 A | * | 9/1969 | Rolf ................................. 264/119 |
| 3,504,403 A | * | 4/1970 | Brown et al. .................... 425/86 |
| 3,753,641 A | * | 8/1973 | Turner et al. ................. 425/451.6 |
| 4,352,653 A | * | 10/1982 | Ott et al. ........................ 425/541 |
| 2008/0254161 A1 | | 10/2008 | Rousseau et al. |

FOREIGN PATENT DOCUMENTS

| DE | 1 002 711 A1 | 2/1957 |
| DE | 10 2007 022 638 A1 | 11/2008 |
| EP | 1 789 247 B1 | 5/2007 |
| WO | 2006/029585 A1 | 3/2006 |
| WO | 2008/138293 A1 | 11/2008 |

* cited by examiner

*Primary Examiner* — Robert B Davis
(74) *Attorney, Agent, or Firm* — Rissman, Hendricks & Oliverio, LLP

(57) ABSTRACT

An apparatus for moulding plastic preforms into plastic containers may include at least one blow mould and a plurality of closure elements cooperating with one another in order to transfer the blow mould between an open condition and a closed condition, in which the blow mould forms a cavity, within which the plastic preforms may be expanded into plastic containers. The closure elements include at least one first mould section and one second mould section. The first mould section and the second mould section may be moved between the closed position and the open position in relation to one another. In a closed condition, the first and second mould sections are locked together. The closure elements may further include a bottom section which may be moved relative to the first and second mould sections in order to close the cavity in one direction. According to various aspects, the bottom section initiates the closing of the mould sections and/or the locking of the mould sections in a closed condition of the blow mould.

22 Claims, 4 Drawing Sheets

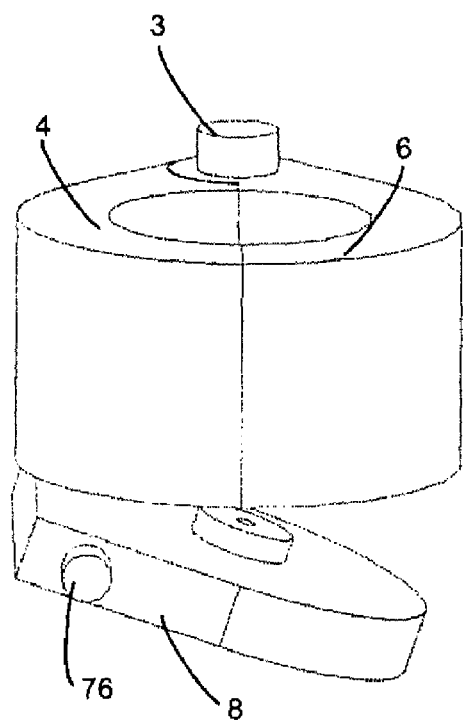
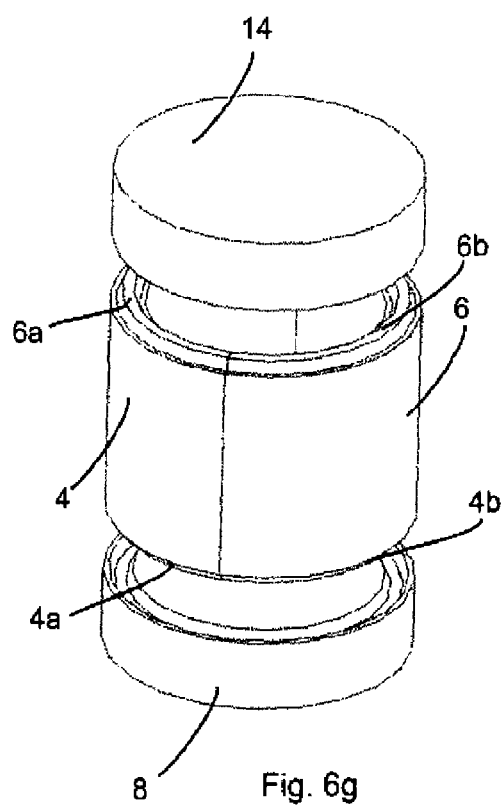
Fig. 6f
Fig. 6g

APPARATUS FOR PRODUCING PLASTIC CONTAINERS

CROSS-REFERENCE TO RELATED APPLICATION

This application claims the benefit of priority of German Patent Application No. 10 2009 008 632.3, filed Feb. 12, 2009, pursuant to 35 U.S.C. 119(a)-(d), the disclosure of which is incorporated herein by reference in its entirety as if fully set forth herein.

TECHNICAL FIELD

The present disclosure relates to an apparatus for producing plastic containers and, more specifically, to an apparatus for moulding plastic preforms into plastic containers.

BACKGROUND

Apparatuses for producing plastic containers have been known from the prior art for quite some time. It is conventional to expand plastic preforms, usually made from polyethylene terephthalate (PET), into plastic containers within the context of a blow moulding process. To this end, the plastic preform is introduced into a blow mould and is expanded against an internal wall of the blow mould.

In some conventional processes, usually lateral sections or mould sections are closed around the preform and the blow mould is also closed towards the bottom by adding a bottom section. Subsequently, the application of pressurised air and in this way the expansion of the preform is commenced. In the prior art, various guide cams are usually used for the individual part movements, i.e., for moving the mould sections or for moving the bottom section. For this reason, such machines have at times four or more guide cams just for closing a respective blow mould. In addition, it is generally necessary to lock an already closed blow mould during the actual expansion process, and very frequently such locking mechanisms are very complex in design.

DE 10 2007 022 638 A1 describes an apparatus for blow moulding containers. In this apparatus, one of the mould carriers remains stationary and the other mould carrier is held in a pivotal manner by a support structure, and a bottom section is movably disposed relative to each of the two mould carriers, whilst the bottom section has a path of travel in relation to the mould carriers, which includes both a component extending in a longitudinal direction of the blow moulding station and a component extending transversely relative to the longitudinal direction. However, this procedure for moving the bottom section up to the blow mould is relatively complex.

From EP 1 789 247 B1, there is also known an apparatus for blow moulding containers, and here too both the mould carriers and the bottom section are arranged to be mechanically positioned and the mould carriers and the bottom section are permanently coupled to one another by means of a common mechanical drive unit.

DE 100 2711 A1 describes a blow mould and a method for closing this blow mould. Herein, two mould halves are pivotally connected to each other by a connection axis. A closure unit is provided in order to close the two mould halves.

US 2008/0254161 A1 describes a mould apparatus for producing thermoplastic containers. Here, a blow nozzle is provided which can move in an axial direction, and the blow mould is composed of two mould halves and is surrounded by a sloped rim. The blow nozzle itself has a corresponding surrounding element which locks the upper portion of the closed blow mould.

It may therefore be desirable to provide an apparatus for moulding plastic preforms into plastic containers, which has a simpler design compared to conventional apparatuses with respect to the handling thereof. In addition, it may be desirable to provide improved locking mechanisms for blow moulds in apparatuses for moulding plastic preforms into plastic containers.

SUMMARY OF INVENTION

In accordance with various aspects of the disclosure, an apparatus for moulding plastic preforms into plastic containers may comprise at least one blow mould, wherein the apparatus has closure elements which cooperate with one another in order to transfer the blow mould between an open condition and a closed condition in which the blow mould forms a cavity, within which the plastic preform may be expanded into plastic containers. Here, the closure elements include at least one first mould section and one second mould section, wherein the first mould section and the second mould section can be moved in relation to one another between the closed position and the open position. Further, the closure elements include a bottom section which may be moved with respect to the first and second mould sections in order to close the cavity in one direction. According to the disclosure, the bottom section, or a movement of the bottom section, initiates at least the closing of the first and second mould sections and/or the locking of the mould sections in a closed condition of the blow mould.

In some prior art, the movements of the mould sections and of the bottom section are usually driven by means of independent cams. If a coupling between a movement of the mould sections and the bottom section is provided, the mould sections are usually driven and a movement of the mould sections will, through a coupling, also result in a movement of the bottom section. Within the context of the above-mentioned first variant, it is proposed that now primarily the bottom section is driven and via this drive, the closing and/or locking of the mould section is/are achieved. In this context, the disclosure utilises the fact that the driving of the movement of the bottom section via guide cams may be implemented in a mechanically simpler manner than a movement of the (two) mould sections.

The bottom section is understood to mean that section which in a closed condition of the blow mould defines the cavity in the direction of a bottom of the container. More specifically, a mouth of the container is positioned in a direction of the blow mould which is opposite to that of the bottom section.

The mould sections surround the container in a closed condition of the blow mould in the circumferential direction thereof. In some aspects, the mould sections completely surround the container in the circumferential direction and, in various aspects are particularly formed symmetrically relative to one another.

In some aspects, the bottom section locks the two mould sections together in a closed condition.

In some prior art, the bottom section is typically held when the two mould sections are folded together, and in this way the bottom section is locked by closing the mould sections. According to the disclosure, it is proposed to design this process in such a way that now the bottom section locks the two mould sections together, so that the two mould sections can no longer be opened once the bottom section has been applied. In various aspects, the blow mould as part of a blow moulding station is disposed on a rotating blowing wheel. This blowing wheel may continuously rotate during working operation. In order to move the closure elements, for example, guide cams which are disposed to be stationary may be used. However, it is also possible to provide a bottom section which, whilst not locking the mould sections, effects the closing operation of the mould sections (e.g. via a suitable coupling).

According to various aspects, some of the stationary guide cams may be replaced by means of coupling several closing elements together. Here, it is suitable to use a guide cam for the bottom as the single drive element for the closure elements.

In some aspects, pneumatic or hydraulic cylinders may be used for transmitting force, so that the need for using stationary cams as closure elements is eliminated. This may be desirable with respect to aseptic machines with a clean room, since any lubrication of the stationary cams may be eliminated.

In accordance with various aspects, a locking means may be disposed on the bottom section, which will lock the two mould sections together in the closed condition of the blow mould.

It may be desirable that the locking means have a first locking element which contacts the first mould section in a closed condition of the blow mould, as well as a second locking element which contacts the second mould section in a closed condition of the blow mould. These two locking elements may be rigidly disposed opposite one another. In this way it may be achieved that by means of a positive hold between the locking element and portions of the mould parts, these are locked relative to one another.

In an exemplary embodiment, the two mould sections are at least in sections disposed between the two locking elements in a closed condition of the blow mould. More specifically, a bottom portion of the mould sections is disposed between the two locking elements, and the mould sections are pushed together by these two locking elements. In particular, the two portions of the mould sections may be disposed between the two locking elements in a radial direction of the blow mould.

According to some aspects, a contact surface between the locking elements and the mould sections extends in the direction of the cavity. In this way, insertion slopes may be created which simplify the placement of the bottom section on the two mould sections.

However, it would also be conceivable that the locking elements are used at the same time as closure elements for the mould sections. Thus, the locking elements could, for example, be formed as an expanding cone towards the top or in the direction of the mould sections, so that as a result of a movement of the bottom section in the direction of the two mould sections, also the closing movement of the mould sections is achieved or initiated.

In an exemplary embodiment, at least one mould section has a sloped surface in a contact area with the bottom section. It may be desirable that both mould sections have a sloped surface in the mentioned contact area with the bottom section. The sloped surface may, for example, be formed to be conical.

In an exemplary embodiment, at least one of the two mould sections may be pivoted about an axis extending parallel to a longitudinal direction and by means of this pivoting movement, the closing and opening of the mould sections may be achieved. The two mould sections may, for example, be pivoted about the mentioned axis.

In an exemplary embodiment, a movement of the bottom section is coupled to a movement of at least one mould section. To this end, the apparatus preferably has coupling means which couples a movement of the bottom section at least at times to a movement of at least one mould section.

In an exemplary embodiment, the coupling means includes a first coupling element which connects the first mould section to the bottom section, and a second coupling element which connects the second mould section to the bottom section. In this way, a particularly reliable coupling may be achieved.

A coupling means between the bottom section and a mould section may, for example, include a moveable guide cam in which the bottom section is, for example, in continuous engagement with the mould section, so that any large loads and lubrication of this coupling means are avoided.

In this way it is possible to dispense with individual guide cams, since the above-mentioned movements of the mould sections and of the bottom section are coupled to each other.

In an exemplary embodiment, the coupling means translates a movement of the bottom section in a longitudinal direction of the blow mould into a movement of at least one mould section in a direction extending vertically to this longitudinal direction. In an exemplary embodiment, the apparatus has at least one pneumatic drive unit for moving the bottom section. Correspondingly, also a pneumatic drive unit could be used for moving the mould sections.

In an exemplary embodiment, the coupling between a mould carrier and the bottom section is not carried out via a horizontal cam, but via an essentially vertical cam, since this is less problematic in connection with the setting up of the mould sections during assembly.

In addition, as mentioned, a complete main cam and a correspondingly relatively complex drive on the mould carrier or the mould sections may be dispensed with. The locking is, as mentioned above, carried out here by means of a type of cone which engages in the mould carrier from the bottom, i.e., in both mould sections, and which in particular also sits on the bottom section.

In addition, rollers may be attached to a cone-like surface of the locking elements, which minimise any friction of the cone surfaces. In the locking position of the closing elements, latches for the rollers or for the protrusions attached to the closing elements may be provided on the closing elements, in order to keep the closing elements in the locking position. By means of a release mechanism, for example a cam, unlocking at a desired point in time may be achieved.

It would further be conceivable to dispense also with a centering of the bottom, if appropriate power transmission means which couple the movement of the mould sections to the movement of the bottom section are accurately designed. If for moving the bottom section a pneumatic element such as a pneumatic cylinder is used, it is possible that this pneumatic cylinder will only move up to a limit position or up to a stop position on a lever. In this way, wear may be reduced.

However, instead of a pneumatic cylinder it would also be possible to provide linear drives, such as for example electromotoric linear drives or hydraulic drives.

In an exemplary embodiment, the apparatus further has a blow nozzle unit, which may be moved relatively to the mould sections and which closes the blow mould in the closed condition in one direction. In this way it is possible that the blow nozzle unit closes the two mould sections at the top and the bottom section closes the blow mould at the bottom, so that in this way a closure means for the mould sections may be completely dispensed with. In this way also a guide cam for locking the mould sections may be dispensed with. In various aspects, blow moulding segments are disposed on the mould sections, against the internal wall of which the containers are expanded.

It may be desirable that a movement of the blow nozzle unit may also be coupled to a movement of the bottom section and/or the mould sections. In an exemplary embodiment, the blow nozzle unit locks the two mould sections together in the closed condition of the blow mould.

In an exemplary embodiment, any movements of the blow nozzle unit of at least one of the mould sections and the bottom section are coupled to one another. In this way it is possible to dispense with a further guide cam. If necessary, also a coupling of an additional locking element for the mould sections may be included in this coupling.

The present disclosure is further directed to a system for handling containers and in particular for moulding plastic preforms into containers, which system includes a plurality of apparatus or blow moulding stations of the above-mentioned type, which also have disposed and are arranged on a rotatable carrier or a blowing wheel.

In addition, the present disclosure is also directed to a method for moulding plastic preforms into plastic containers, wherein closure elements of at least one blow mould cooperate with one another, in order to transfer the blow mould between an open condition and a closed condition in which the blow mould forms a cavity, within which the plastic preforms are expanded into plastic containers. The closure elements may include at least one first mould section and one second mould section, wherein the first mould section and the second mould section are moved relative to each other between the closed position and the open position and the mould sections are locked relative to each other in a closed condition. The closure elements may include a bottom section which is moved relative to the mould sections in order to close the cavity in one direction. According to the disclosure, the bottom section initiates at least the closing of the mould sections and/or the locking of the mould sections in a closed condition of the blow mould.

According to various aspects, the bottom section locks the two mould sections together in a closed position.

Some further advantages and embodiments may become evident from the attached drawings.

BRIEF DESCRIPTION OF THE DRAWINGS

In the drawings:

FIGS. 6a-6g show various illustrations of exemplary movement mechanisms for the bottom sections of exemplary apparatuses according to various aspects of the disclosure.

DETAILED DESCRIPTION

Figure 1:
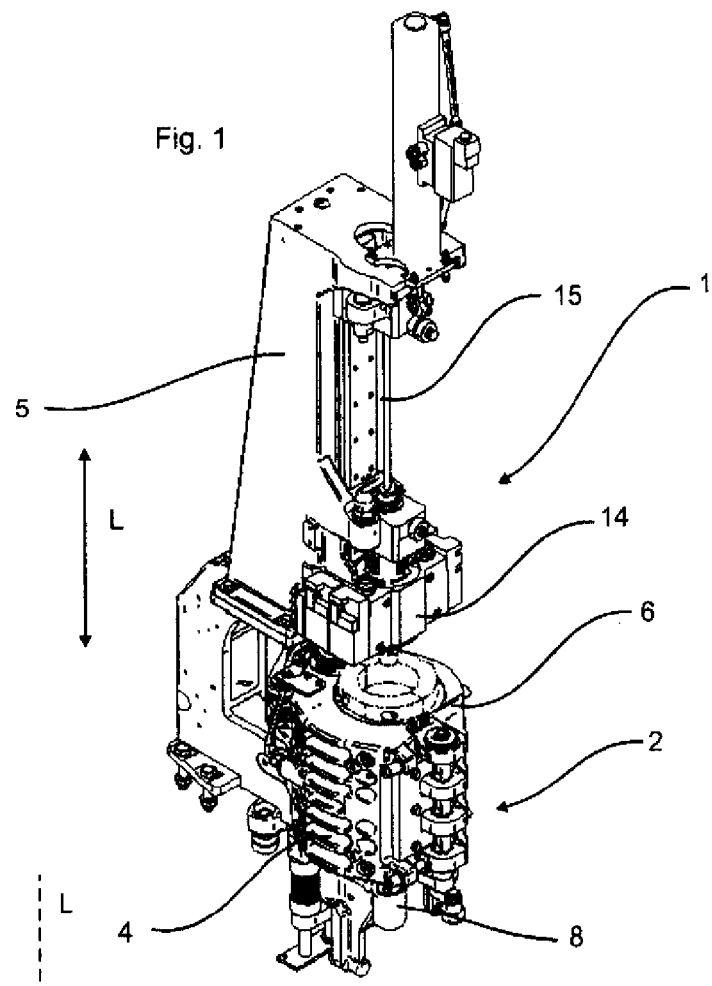
FIG. 1 shows a schematic illustration of an exemplary apparatus for moulding plastic containers according to various aspects of the disclosure.

FIG. 1 illustrates a perspective view of an exemplary apparatus according to the disclosure; for example, a blow moulding station for expanding plastic preforms into plastic containers. The apparatus 1 comprises a blow mould 2 which is comprised of a first mould section 4 and a second mould section 6. One of these mould sections 4, 6 may be pivoted relative to the other, and to this end, for example, one or both mould sections 4, 6 may be pivotable.

Further, a bottom section 8 (only partially shown) is provided, which closes the entire blow mould 2 from the bottom. A blow nozzle unit 14 is provided which is here lowered from the top onto the two mould sections 4, 6 and which includes a blow nozzle for expanding the plastic preforms into plastic containers. The mould sections 4, 6 together with the bottom section 8 and the blow nozzle unit 14 constitute the closure elements for the blow mould 2.

In this connection it is possible that a plurality of such blow moulding stations 1 are disposed on a rotatable blowing wheel. The use of the blow moulding station shown is, however, also conceivable in connection with phased machines. Reference numeral 15 relates to a stretching rod which is used for stretching the plastic preforms. A lifting unit for moving the blow nozzle unit 14 is here disposed on a carrier 5.

Figure 2:
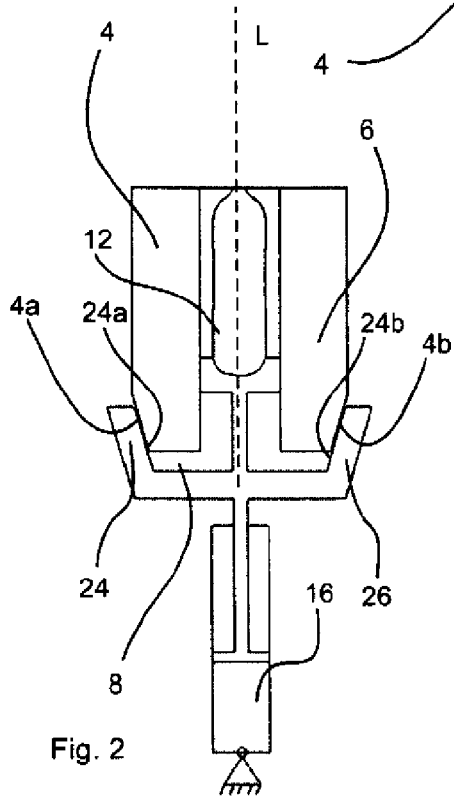
FIG. 2 shows a schematic partial illustration of an exemplary apparatus according to various aspects of the disclosure.

FIG. 2 shows a schematic partial view of the apparatus 1 shown in FIG. 1. Here, again, the two mould sections 4 and 6 may be seen, which in a closed condition form a cavity or receptacle 12 for receiving a container (not shown). Here, reference letter L identifies the longitudinal direction of the container and here also of the apparatus 1. Reference numeral 8 identifies the bottom section which may here be moved by means of a drive unit, such as, for example, a pneumatic cylinder 16, in the direction of the axis L and which, in the closed condition as shown in FIG. 2, locks the two mould sections 4 and 6 relative to each other. More specifically, the bottom section 8 has two locking elements 24 and 26 for this purpose, which in a closed condition clasp the two mould sections 4 and 6 and press them against each other. To this end, the two mould sections 4 and 6 have sloped surfaces 4a and 6a which cooperate with sloped surfaces 24a, 26a which widen out from the bottom upwards and which are located on the locking elements 24 and 26. In this way, the two mould sections 4 and 6 are pressed against each other by a movement of the bottom section from the bottom to the top and are thus locked. Here, the mould sections 4, 6 can not be opened until after the bottom section 8 has been either removed or lowered.

Figure 3:
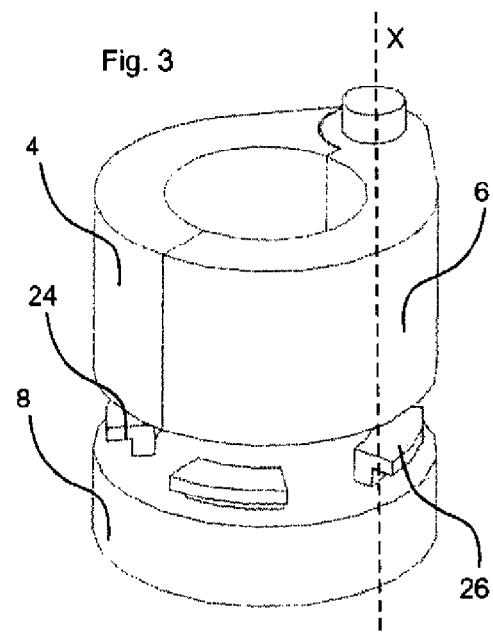
FIG. 3 shows an illustration of an exemplary apparatus according to various aspects of the disclosure.

FIG. 3 shows a further embodiment of a locking mechanism according to the invention. A bayonet-like closure is provided for this mechanism. In this context it is possible that the bottom section 8 is initially moved up to the mould sections 4 and 6 and is then rotated. As a result of this rotation, and if the internal areas of the mould sections 4 and 6 are designed in an appropriate manner, the two mould sections 4 and 6 are locked together. The two locking elements 24 and 26, which are here disposed on the bottom section 8, will here respectively engage in appropriately formed surfaces (not shown) within the two mould sections 4 and 6, so that in this way the locking may be achieved.

Figure 4A:
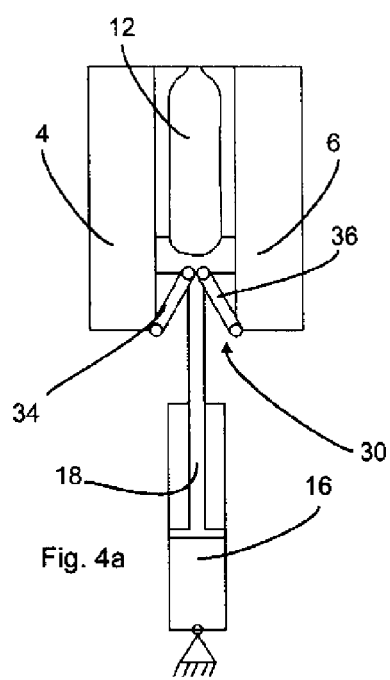
FIGS. 4a-4d show schematic partial illustrations of exemplary apparatuses according to various aspects of the disclosure.

FIG. 4a shows a schematic view for illustrating a coupling unit 30 between a bottom section 8 and the two mould sections 4 and 6. In this embodiment, a first coupling element 34 and a second coupling element 36 are provided, wherein the first coupling element 34 couples the first mould section 4 or a movement thereof to a movement of the bottom section 8. The second coupling element 36 couples a movement of the second mould section 6 to the bottom section 8. If on the basis of the position shown in FIG. 4a the lifting rod 18 is lowered, the two coupling elements 34 and 36 will cause the two mould halves 4 and 6 to be pushed apart and in this way, for example a container which has already been produced may be removed.

Figure 4B:
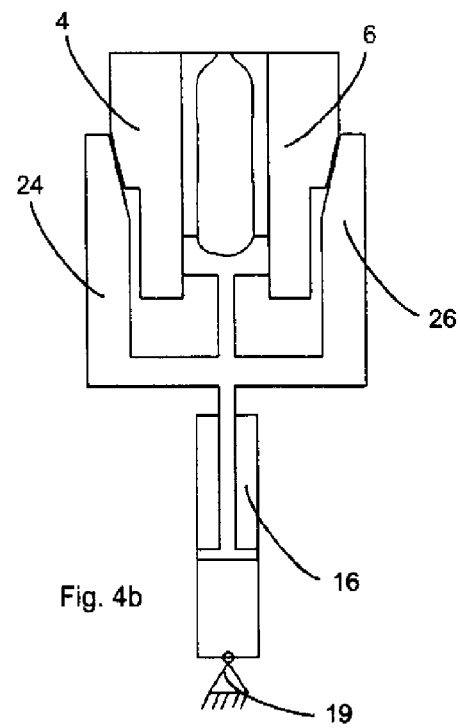

FIG. 4b shows a further illustration of an apparatus according to the disclosure. In this illustration, a part of a bottom section 8 extends between the two mould sections 4 and 6 and a further part, which also comprises here the two locking elements 24 and 26, surrounds the two mould sections 4 and 6 and presses them against each other. In this way, too, a sealing connection between the bottom section 8 and the two mould sections 4 and 6 will be achieved. Further, it would also be possible to provide sealing elements made of a flexible material on the mould sections 4, 6 and/or on the bottom section 8, in order to achieve a suitable seal once the sections have been pressed together.

Figure 4C:
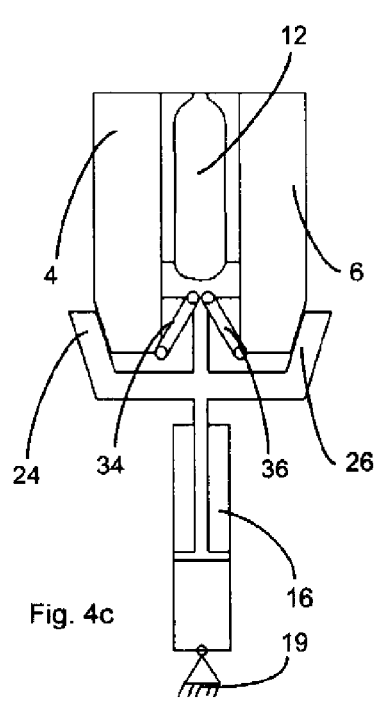

FIG. 4c shows a further embodiment of an apparatus according to the disclosure, in which both the coupling by means of the two coupling elements 34 and 36 as well as the locking of the two mould sections 4 and 6 by means of the two locking elements 24 and 26 are illustrated. Reference numeral 19 relates to a point of support where the hydraulic cylinder 16 is mounted.

Figure 4D:
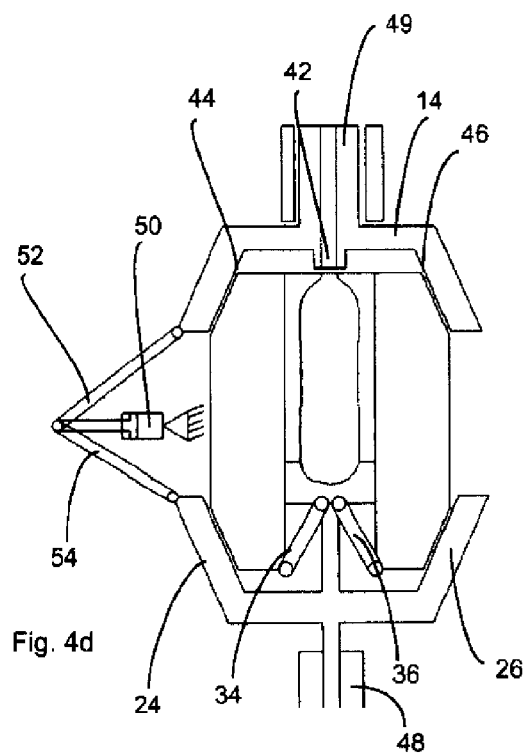

FIG. 4d shows a further embodiment of an apparatus according to the disclosure, wherein also the movement of a blow nozzle unit 14 is coupled to the other movements. To this end, a pneumatic cylinder 50 is provided here which causes, via second coupling elements 52 and 54, the bottom section 8 and the blow nozzle unit 14 to be moved either towards each other or away from each other. The bottom section 8 in its turn has coupled thereto the two mould sections 4 and 6 via the first coupling elements 34 and 36 already described above, so that here all of the closure elements are coupled to each other and therefore only a cam or a pneumatic cylinder will be needed for driving. However, it would also be possible to use, in addition to or instead of the pneumatic cylinder 50 shown, the pneumatic cylinder 16 mentioned in the above figures for a direct movement of the bottom section 8. Reference numeral 42 relates to a blow nozzle in order to apply a gaseous medium such as, for example, air onto the container.

Reference numerals 44, 46 identify sloping areas widening out in the direction of the mould sections 4, 6, in order to lock the mould sections together. The bottom section 8 and the blow nozzle unit 14 are guided by means of linear guides 48, 49.

Figure 5:
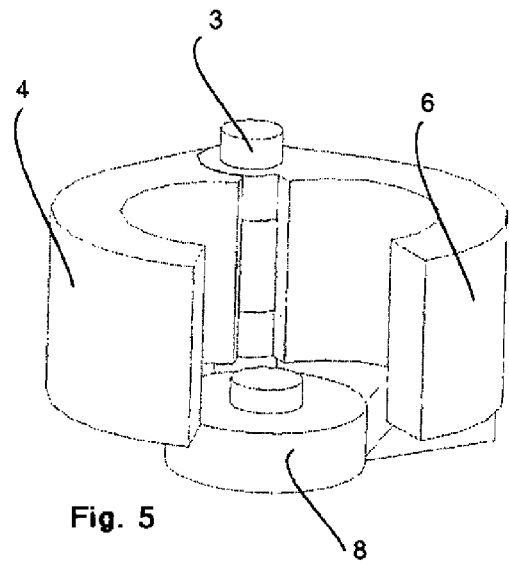
FIG. 5 shows an illustration of an open blow mould according to various aspects of the disclosure.

FIG. 5 shows a further view for illustrating a blow mould according to the disclosure. Here, too, an engagement between the bottom section 8 and the two mould sections 4 and 6 is possible, wherein the two mould sections 4 and 6 may be pivoted relative to each other about a pivot shaft 3 as shown.

Figure 6A:
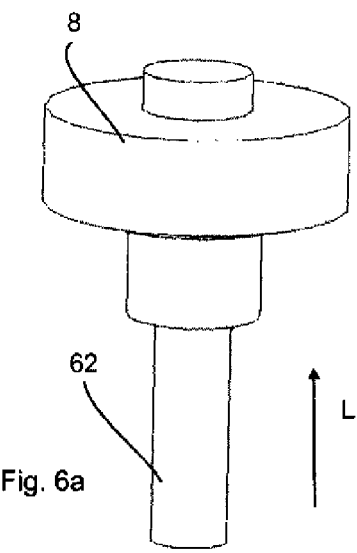

FIG. 6a shows a first embodiment for achieving a movement of the bottom section 8. Here a pneumatic cylinder 62 is provided which moves the bottom section 8 directly in the longitudinal direction as shown in FIG. 1. In some aspects, also a threaded spindle (62) may be provided here, which is driven via a drive element such as a nut.

Figure 6B:
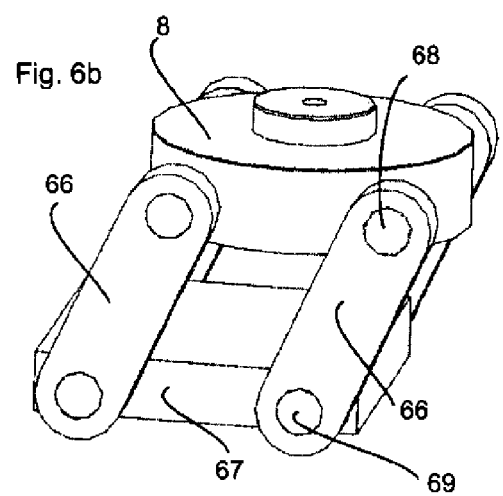
Figure 6C:
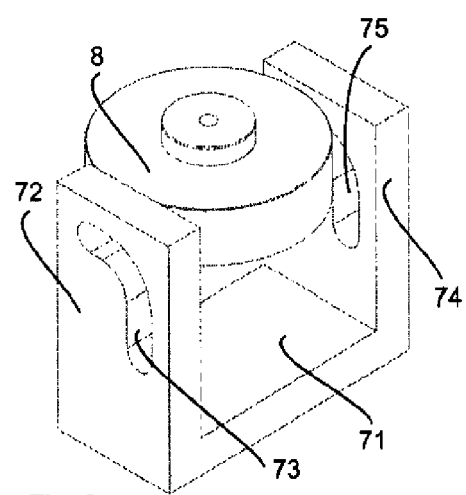

In the case of the embodiment shown in FIG. 6b, a four-link mechanism is used for lifting the bottom section 8. More specifically, four articulated levers 66 are provided here, which are mounted both on a bottom plate 67 via articulated shafts 69 and on the bottom section 8 via articulated shafts 68. In this case, the bottom section 8 is not only lifted but it is also moved sidewards. In the case of the mechanism shown in FIG. 6c, a support 71 is provided on which the two lateral portions 72 and 74 are mounted. In these lateral portions, curved grooves 73, 75 are provided which also allow a movement of the bottom section 8 upwards on the one hand, but here also in a further direction. In this embodiment, the spatial orientation of the bottom section 8 is preferably not changed.

Figure 6D:
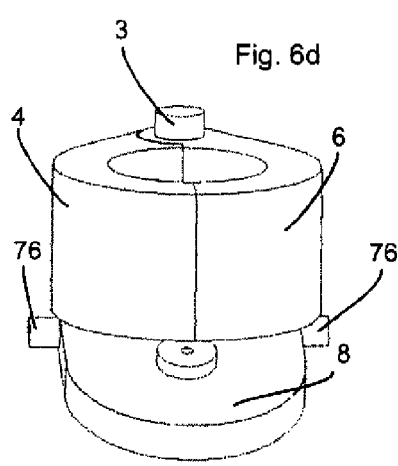

In the embodiments shown in FIGS. 6d and 6f, the bottom section 8 is hinged in each case via a pivot shaft 76 below the two mould sections 4 and 6 and may be folded about this shaft 76 up to the two mould sections 4 and 6. Here, too, the mould sections 4 and 6 may be pivoted relative to each other about the pivot shaft 3. Whilst in the embodiment shown in FIG. 6d the pivot shaft 76 extends in the area of both mould sections 4 and 6, in the embodiment shown in FIG. 6f it is disposed in the area of just one of the two mould sections 4, 6.

Figure 6E:
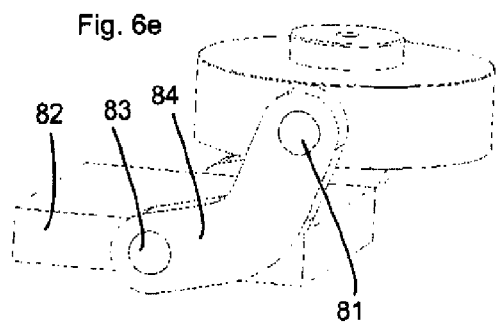

FIG. 6e shows a further embodiment for illustrating a movement of the bottom section 8. Here a rocker bar 84 is provided which is disposed on a support plate 82 via a shaft 83 and on the bottom section 8 via an articulated shaft 81.

FIG. 6g shows a further view for illustrating the locking. It can be seen here that the two mould sections 4 and 6 are locked by means of the bottom section 8 and the blow nozzle unit 14, when the bottom section 8 and the blow nozzle unit 14 are moved towards each other. To this end, sloped surfaces 4a, 4b, 6a, 6b are again provided here on the mould section, which effect a locking together of the two mould sections 4 and 6. Correspondingly, the bottom section 8 and also the blow nozzle unit 14 have corresponding sloped surfaces, but here only the sloped surfaces 8a of the bottom section are shown.

It will be apparent to those skilled in the art that various modifications and variations can be made to the apparatuses for producing plastic containers of the present disclosure without departing from the scope of the invention. Other embodiments of the invention will be apparent to those skilled in the art from consideration of the specification and practice of the invention disclosed herein. It is intended that the specification and examples be considered as exemplary only.

What is claimed is:

1. An apparatus for moulding plastic preforms into plastic containers, comprising:
   at least one blow mould having a closed condition forming a cavity within which plastic preforms may be expanded into plastic containers; and
   a plurality of closure elements cooperating with each other in order to transfer the blow mould between an open condition and said closed condition, the closure elements comprise
   at least one first mould section and one second mould section, wherein the first mould section and the second mould section are moveable relative to one another between the closed position and an open position, the first and second mould sections being locked together in the closed condition of the mould sections, and
   a bottom section which is moveable relative to the first and second mould sections in order to close the cavity in one direction, wherein the bottom section initiates at least the closing of the mould sections or the locking of the mould sections in the closed condition of the blow mould, wherein the first and second mould sections are pivotable relative to each other about an axis extending parallel to a longitudinal direction of the blow mould.

2. The apparatus as claimed in claim 1, further comprising a locking device disposed on the bottom section, which in the closed condition of the blow mould locks the first and second mould sections together.

3. The apparatus as claimed in claim 2, wherein the locking device has a first locking element which in the closed condition of the blow mould contacts the first mould section, as well as a second locking element which in the closed condition of the blow mould contacts the second mould section.

4. The apparatus as claimed in claim 3, wherein in the closed condition of the blow mould, the first and second mould sections are disposed at least in sections between the two locking elements.

5. The apparatus as claimed in claim 3, wherein a contact surface widens out between the locking elements and the first and second mould sections in the direction of the cavity.

6. The apparatus as claimed in claim 1, wherein at least one of the first and second mould sections has a sloped surface in a contact area with the bottom section.

7. The apparatus as claimed in claim 1, wherein a movement of the bottom section is coupled to a movement of at least one of the first and second mould sections.

8. The apparatus as claimed in claim 7, further comprising a coupling unit having a first coupling element which connects the first mould section to the bottom section, and a second coupling element which connects the second mould section with the bottom section.

9. The apparatus as claimed in claim 1, further comprising a coupling unit configured to translate a movement of the bottom section in a longitudinal direction of the blow mould into a movement of at least one mould section in a direction extending vertically to said longitudinal direction.

10. The apparatus as claimed in claim 1, further comprising a pneumatic drive unit for moving the bottom section.

11. The apparatus as claimed in claim 1, further including a blow nozzle unit which is movable relatively to the mould sections and which closes the blow mould in the closed condition in one direction.

12. The apparatus as claimed in claim 11, wherein a movement of the blow nozzle unit is coupled to a movement of the bottom section.

13. The apparatus as claimed in claim 11, wherein the blow nozzle unit locks the two mould sections together in a closed condition of the blow mould.

14. The apparatus as claimed in claim 11, wherein movements of the blow nozzle unit, of at least one mould section, and of the bottom section are coupled to one another.

15. An apparatus for moulding plastic preforms into plastic containers, comprising:
   at least one blow mould having a closed condition forming a cavity within which plastic preforms are expandable into plastic containers; and
   a plurality of closure elements cooperating with each other in order to move the blow mould between an open condition and said closed condition, the closure elements comprise
   a first mould section of the blow mould, a second mould section of the blow mould, the first mould section and the second mould section being movable relative to one another between the closed position and an open position, the first and second mould sections being lockable together in said closed condition of the mould sections, and
   a bottom section of the blow mould, said bottom section being moveable relative to the first and second mould sections in order to close the cavity in one direction, said bottom section being configured to initiate at least one of the closing of the first and second mould sections and the locking of the first and second mould sections in the closed condition of the blow mould, and further comprising a blow nozzle unit movable relative to the first and second moule sections, the blow nozzle unit being configured to at least one of initiating the closing the blow mould in one direction in the closed condition of the blow mould and lock the first and second mould sections together in the closed condition of the blow mould.

16. The apparatus as claimed in claim 15, wherein the bottom section of the blow mould includes a locking device configured to lock the first and second blow mould sections together in the closed condition of the blow mould.

17. The apparatus as claimed in claim 15, wherein the first and second mould sections are pivotable relative to each other about an axis extending parallel to a longitudinal direction of the blow mould, at least one of the first and second mould sections being coupled to the bottom section such that movement of the bottom section in a longitudinal direction of the blow mould is coupled to said relative pivotable movement of the first and second mould sections.

18. The apparatus as claimed in claim 15, wherein a movement of the blow nozzle unit is coupled to a movement of at least one of the bottom section, the first blow mould section, and the second blow mould section.

19. An apparatus for moulding plastic preforms into plastic containers, comprising:
   at least one blow mould having a closed condition forming a cavity within which plastic preforms may be expanded into plastic containers; and
   a plurality of mould elements cooperating with each other in order to provide an open condition and said closed condition of the blow mould, the mould elements comprise
   at least one first mould section and one second mould section, wherein the first mould section and the second mould section are moveable relative to one another between the closed position and an the open position, the first and second mould sections being locked together in the closed condition of the mould sections, and
   a bottom section which is moveable relative to the first and second mould sections in order to close the cavity in one direction,
   wherein the apparatus is an aseptic machine with a clean room, and
   wherein the machine comprises a locking device configured to lock the mould sections, and
   wherein the locking device has a first locking element which in the closed condition of the blow mould contacts the first and second mould sections from one side, as well as a second locking element which in the closed condition of the blow mould contacts the first and second mould sections from another side, and
   wherein in a closed condition the first and second sections are at least in sections disposed between the two locking elements, and
   wherein the first and second mould sections are pivotable relative to each other about an axis extending parallel to a longitudinal direction of the blow mould.

20. The apparatus as claimed in claim 19, wherein the two locking elements are fixed with respect to each other.

21. The apparatus as claimed in claim 19, wherein a contact surface between the locking elements and the mould sections widens in the direction of the cavity.

22. The apparatus as claimed in claim 19, wherein the locking device is disposed at the bottom section.

* * * * *